March 20, 1945.  H. J. LINGAL  2,372,098

BUSHING

Filed March 20, 1943

WITNESSES:

INVENTOR
Harry J. Lingal.
ATTORNEY

Patented Mar. 20, 1945

2,372,098

UNITED STATES PATENT OFFICE 2,372,098

BUSHING

Harry J. Lingal, Forest Hills, Pa., assignor to Westinghouse Electric & Manufacturing Company, East Pittsburgh, Pa., a corporation of Pennsylvania Application March 20, 1943, Serial No. 479,891

11 Claims. (Cl. 174—75)

The present invention relates to insulating bushings for high-tension electrical apparatus, and particularly to a construction of the support for the bushing and the casing thereof.

In bushings, particularly of the larger sizes, there is a problem in taking care of the relative expansion of the porcelain and metallic parts with variations in temperature, and it is an object of the invention to provide a bushing, including its weather casing, in which this problem is economically solved.

Figure 1:
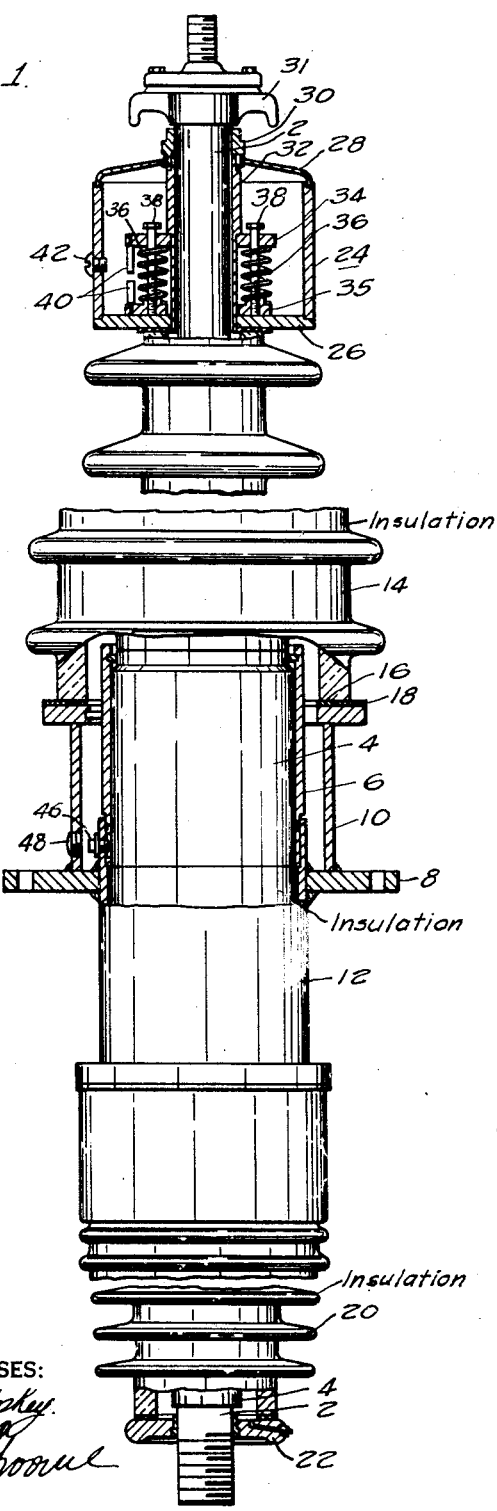
Figure 2:
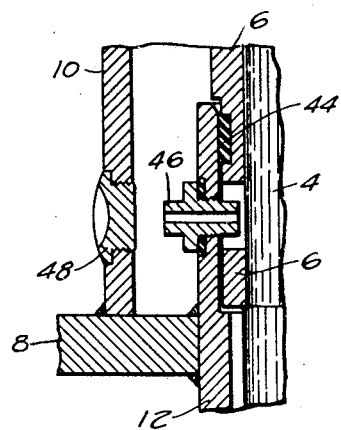

Other objects of the invention will be apparent from the following description with reference to the accompanying drawing, in which:

Figure 1 is a view in elevation, partly in section and partly broken away, illustrating a bushing in accordance with the invention, and Fig. 2 is a fragmentary view in section of a portion of the bushing shown in Fig. 1.

Referring to the drawing, a conducting stud 2 is threaded at both ends for connection at the lower end with high tension electrical apparatus, such as a circuit breaker or transformer, and at the upper end with the circuit or transmission line to be associated with such circuit breaker or transformer. In the present instance, the conductor or conducting stud 2, which may be solid or tubular, is provided with an insulated wrapping which may be of the condenser type comprising alternate layers of insulation and metallic foil, and is wound on the stud and firmly secured thereto. Such wrapping becomes progressively greater in diameter from the ends of the stud toward the middle and a metallic collar 6 surrounds substantially the midpoint of the wrapping with a press fit.

In order to support the bushing upon the casing of a transformer or circuit breaker, a mounting plate 8 is provided having an upstanding cylindrical flange 10 and a depending cylindrical flange 12 both suitably secured to plate 8, as by welding, as indicated. A substantially tubular or cylindrical weather casing 14, usually of porcelain, is supported upon the upstanding flange 10 with suitable gaskets between the lower edge of the porcelain and an outwardly projecting flange on the flange 10. The gasket means preferably comprises a relatively soft gasket 16 and a gasket 18 of harder material to act as a mechanical stop to protect the gasket 16. Similarly, a lower porcelain shell 20 abuts the lower flange 12 with a gasket arrangement therebetween the same as that above described.

At the lower end of the conductor 2, a closure plate 22 is threaded thereon in fluid tight relation to bear against the lower end of the porcelain shell 20, with a gasket therebetween to form a lower closed chamber. The upper end of the porcelain shell 14 is closed by an expansion chamber 24 having a base 26 bearing against the upper edge of the shell with a gasket therebetween, and a top 28 of flexible sheet material brazed or soldered to a thimble 30 surrounding the conductor 2. Such thimble is slidably disposed on stud 2, but is positioned on the stud by nut 31, and bears against a sleeve 32 slidably surrounding the conductor. The sleeve 32 is provided with an annular shoulder engaging a compression plate 34 bearing upon a plurality of compression springs 36 which react against a second compression plate 35 seated on the chamber base 26. By this construction the two porcelain shells are resiliently clamped together with the mounting plate and its flanges therebetween. Any relative movement between the conducting stud and the porcelain, due to temperature variations, will be taken up by the springs 36 which are initially adjusted with sufficient compression to compensate for such movement over the normal operating temperature range of the bushing.

To facilitate assembly of the bushing, bolts 38 extend through the centers of the springs and when the thimble 30 and sleeve 32 are moved to operating position by nut 31 they may be retained in position to center the springs. To assist in determining the amount of initial compression of the springs 36 as well as to check on their condition in service, gage points 40 are carried respectively by the compression plates 34 and 35. A screw 42 in the side wall of the expansion chamber may be removed so that the gage point spacing may be observed.

The upper portion of the depending flange 12 projects slightly through the opening in the mounting plate 8 and is proportioned to telescopically receive the lower end of the collar 6 which is secured to the insulating wrapping 4. This results in a sliding fit and, if desired, a gasket 44 (Fig. 2) may be provided to make a tight joint. The bushing casing is filled with an insulating fluid such as oil, and the gasket 44 may be necessary to prevent too much circulation, between the two chambers defined by the porcelain shells 14 and 20. However, because of the thermal expansion and contraction of such fluid, some circulation is desirable and this is obtained by means of a stud bolt 46 which is threaded through the upper end of the depending flange 12 below the gasket 44 into a slot extending through the lower edge of the collar 6. Such stud bolt is provided with an axial hole so that communication is obtained from the upper chamber of the bushing through the hole and telescopic joint into the lower chamber. A further purpose of such stud bolt 46 is to limit relative axial movement between the flange 12 and collar 6 in the event that one or both porcelains might be broken. Also, the slot in the collar 6 is substantially the same width as the diameter of the bolt 46 to prevent relative rotation between the collar and flange 12. The bolt 46 is placed in position during the assembly of the structure by means of a removable plug 48 in the upstanding flange 10. After assembling, such plug may be soldered over to insure a fluid tight joint.

In operation, relative expansion between the porcelain and metallic parts is compensated by the springs in the expansion chamber and a limited vertical movement between the conductor and the mounting plate 8 is permitted through the telescopic joint between the collar 6 and the flange 12. The conductor and its insulating wrapping is, therefore, substantially suspended between the ends of the porcelain shells, but its movements are prevented rotationally and restricted vertically by reason of the stud bolt 46. The construction has resulted in a rugged bushing construction for high-tension apparatus at a minimum assembly cost.

Quite obviously modifications may be made in the invention without departing from the spirit and scope thereof, and it is intended that it will be limited only by the scope of the appended claims.

I claim as my invention:

1. In an insulating bushing for high-tension electrical apparatus, a conductor having a cylindrical body of insulation secured thereto intermediate the ends thereof, a mounting plate having a substantially circular aperture therethrough, and a depending cylindrical sleeve having a portion extending through said aperture and secured to the plate, a second sleeve surrounding said body of insulation intermediate the ends thereof and secured thereto and having a portion proportioned to telescopically fit into the extending portion of said first mentioned sleeve with a telescopic fit, and means for limiting relative axial movement of said sleeves.

2. In an insulation bushing for high-tension electrical apparatus, a conductor having a cylindrical body of insulation secured thereto intermediate the ends thereof, a mounting plate having a substantially circular aperture therethrough, and a depending cylindrical sleeve having a portion extending through said aperture and secured to the plate, a second sleeve surrounding said body of insulation intermediate the ends thereof and secured thereto and having a portion proportioned to telescopically fit into the extending portion of said first mentioned sleeve with a telescopic fit, and means for limiting relative axial movement of said sleeves and for preventing relative radial movement thereof.

3. In an insulating bushing for high-tension electrical apparatus, a conductor having a cylindrical body of insulation secured thereto intermediate the ends thereof, a mounting plate having a substantially circular aperture therethrough, and a depending cylindrical sleeve having a portion extending through said aperture and secured to the plate, a second sleeve surrounding said body of insulation intermediate the ends thereof and secured thereto and having a portion proportioned to telescopically fit into the extending portion of said first mentioned sleeve with a telescopic fit, and means for limiting relative axial movement of said sleeves comprising a slot extending through said second sleeve extending parallel to the axis thereof and a stud secured to said first mentioned sleeve having a portion extending therethrough into said slot.

4. In an insulating bushing for high-tension electrical apparatus, a conductor having a cylindrical body of insulation secured thereto intermediate the ends thereof, a mounting plate having a substantially circular aperture therethrough and a depending cylindrical sleeve having a portion extending through said aperture and secured to the plate, a second sleeve surrounding said body of insulation intermediate the ends thereof and secured thereto and having a portion proportioned to telescopically fit into the extending portion of said first mentioned sleeve, gasket means adjacent the upper end of said first mentioned sleeve for rendering fluid-tight the telescopic point between the sleeves, and means for limiting relative axial movement between said sleeves.

5. In an insulating bushing for high-tension electrical apparatus, a conductor having a cylindrical body of insulation secured thereto intermediate the ends thereof, a mounting plate having a substantially circular aperture therethrough and a depending cylindrical sleeve having a portion extending through said aperture and secured to the plate, a second sleeve surrounding said body of insulation intermediate the ends thereof and secured thereto and having a portion proportioned to telescopically fit into the extending portion of said first mentioned sleeve, gasket means adjacent the upper end of said first mentioned sleeve for rendering fluid-tight the telescopic point between the sleeves, and means for limiting relative axial movement between said sleeves, comprising a slot in said second sleeve and a stud bolt extending through said first mentioned sleeve into said slot.

6. In an insulating bushing for high-tension electrical apparatus, a conductor having a cylindrical body of insulation secured thereto intermediate the ends thereof, a mounting plate having a substantially circular aperture therethrough and a depending cylindrical sleeve having a portion extending through said aperture and secured to the plate, a second sleeve surrounding said body of insulation intermediate the ends thereof and secured thereto and having a portion proportioned to telescopically fit into the extending portion of said first mentioned sleeve, gasket means adjacent the upper end of said first mentioned sleeve for rendering fluid-tight the telescopic joint between the sleeves, and means for limiting relative axial movement between said sleeves, comprising a slot in said second sleeve and a stud bolt extending through said first mentioned sleeve into said slot at a point below said gasket means.

7. In an insulating bushing for high-tension electrical apparatus, a conductor having a cylindrical body of insulation secured thereto intermediate the ends thereof, a mounting plate having a substantially circular aperture therethrough and a depending cylindrical sleeve having a portion extending through said aperture and secured to the plate, a second sleeve surrounding said body of insulation intermediate the ends thereof and secured thereto and having a portion proportioned to telescopically fit into the extending portion of said first mentioned sleeve, gasket means adjacent the upper end of said first mentioned sleeve for rendering fluid-tight the telescopic point between the sleeves, and means for limiting relative axial movement between said sleeves, comprising a slot in said second sleeve and a stud bolt extending through said first mentioned sleeve into said slot at a point below said gasket means, a porcelain shell loosely surrounding said conductor and insulation on one side of said mounting plate and means for supporting it thereon in fluid-tight relation, a second porcelain shell loosely surrounding the conductor and insulation on the other side of said plate and means forming a fluid-tight joint between one end thereof and the lower end of said depending sleeve, closures for the free ends of said porcelain shells including means for clamping them in operating position and for making fluid-tight joints with said conductor, and an axial opening through said stud bolt constituting the only communication between the chambers defined by said porcelain shells.

8. In an insulating bushing for high-tension electrical apparatus, a conducting stud having a wrapping of insulation secured intermediate the ends thereof, a mounting flange loosely surrounding said wrapping intermediate the ends thereof and having a depending sleeve secured thereto loosely surrounding said wrapping and extending through the aperture in said flange, a metallic collar surrounding said wrapping and secured thereto in fluid-tight relation and having a lower portion telescoping into the upper end of said depending sleeve, means for limiting relative axial movement between said sleeve and collar, an upper tubular casing of insulating material surrounding said wrapping between said flange and the end of said stud and means for supporting it upon said flange, and resilient means interacting between said end of said stud and the adjacent end of said casing for resiliently supporting said stud and wrapping.

9. In an insulating bushing, a mounting plate having a circular opening, a cylindrical upstanding flange and a cylindrical depending flange on opposite sides of said plate coaxial with said opening, a pair of porcelain shells and means for clamping them to said flanges in axial alignment with said opening against the free edges of said flanges, respectively, including a rigid through conductor having means at each end thereof bearing against and closing the free ends of said shells, gaskets for sealing the joints between said shells, flanges and end-closing means, an insulating wrapping secured to said conductor, a cylindrical metallic collar tightly embracing said wrapping and telescopically extending into said depending flange, gasket means for rendering the telescopic joint fluid-tight thereby defining upper and lower chambers for insulating fluid on opposite sides of said plate, and an aperture of predetermined size to permit a limited flow of such fluid between the two chambers.

10. In an insulating bushing, a mounting plate having a circular opening, a cylindrical upstanding flange and a cylindrical depending flange on opposite sides of said plate coaxial with said opening, a pair of porcelain shells and means for clamping them to said flanges in axial alignment with said opening against the free edges of said flanges, respectively, including a rigid through conductor having means at each end thereof bearing against and closing the free ends of said shells, gaskets for sealing the joints between said shells, flanges and end-closing means, an insulating wrapping secured to said conductor, a cylindrical metallic collar tightly embracing said wrapping and telescopically extending into said depending flange, gasket means for rendering the telescopic joint fluid-tight thereby defining upper and lower chambers for insulating fluid on opposite sides of said plate, means for limiting axial movement between said mounting plate and collar including a stud bolt threaded through a portion of said plate into a vertical slot in said collar.

11. In an insulating bushing, a mounting plate having a circular opening, a cylindrical upstanding flange and a cylindrical depending flange on opposite sides of said plate coaxial with said opening, a pair of porcelain shells and means for clamping them to said flanges in axial alignment with said opening against the free edges of said flanges, respectively, including a rigid through conductor having means at each end thereof bearing against and closing the free ends of said shells, gaskets for sealing the joints between said shells, flanges and end-closing means, an insulating wrapping secured to said conductor, a cylindrical metallic collar tightly embracing said wrapping and telescopically fitting a portion of said depending flange, gasket means for rendering the telescopic joint fluid-tight thereby defining upper and lower chambers for insulating fluid on opposite sides of said plate, means for limiting axial movement between said mounting plate and collar including a stud bolt threaded through a portion of said plate into a vertical slot in said collar, and a through hole axially of said stud bolt to permit the passage of fluid between said upper chamber and lower chamber through the telescopic joint.

HARRY J. LINGAL.